United States Patent
Lu et al.

(10) Patent No.: US 11,125,641 B1
(45) Date of Patent: Sep. 21, 2021

(54) GAS LEAKAGE SENSING DEVICE

(71) Applicant: MAS AUTOMATION CORP., Hsinchu (TW)

(72) Inventors: Chin-Cheng Lu, Hsinchu (TW); Pei-Chih Lin, Hsinchu (TW)

(73) Assignee: MAS AUTOMATION CORP., Hsinchu (TW)

( * ) Notice: Subject to any disclaimer, the term of this patent is extended or adjusted under 35 U.S.C. 154(b) by 0 days.

(21) Appl. No.: 16/868,720

(22) Filed: May 7, 2020

(30) Foreign Application Priority Data

Mar. 5, 2020 (TW) .................................. 109202442

(51) Int. Cl.
*G01M 3/10* (2006.01)
*G01M 3/24* (2006.01)

(52) U.S. Cl.
CPC ................. *G01M 3/10* (2013.01); *G01M 3/24* (2013.01)

(58) Field of Classification Search
CPC ........... G01M 3/10; G01M 3/106; G01M 3/24
See application file for complete search history.

(56) References Cited

U.S. PATENT DOCUMENTS

| | | | | |
|---|---|---|---|---|
| 3,033,023 A | * | 5/1962 | Hooper | G01M 3/10 73/45.5 |
| 4,103,536 A | * | 8/1978 | Chipman | G01M 3/00 73/40 |
| 2017/0356838 A1 | * | 12/2017 | Knollenberg | G01N 15/1425 |

FOREIGN PATENT DOCUMENTS

JP       2007047056 A  *  2/2007

* cited by examiner

*Primary Examiner* — Paul M. West
*Assistant Examiner* — Mark A Shabman
(74) *Attorney, Agent, or Firm* — Chun-Ming Shih; HDLS IPR Services

(57) ABSTRACT

The present invention provides a gas leakage sensing device comprising a gas conduit, a liquid storage tank and a bubble sensing component. The gas conduit guides leaking gas from industrial equipment into a liquid in the liquid storage tank through an exhaust port and generates bubbles. A monitoring part with a bubble sensing component is formed on the tank wall of the liquid storage tank, the height of the monitoring part from the liquid surface is less than the height of the exhaust port from the liquid surface. By sensing the size, amount of generated bubbles, and floating frequency of the bubbles generated in the liquid, the flow rate and volume of the leaking gas are obtained to improve the accuracy of sensing the leaking gas.

3 Claims, 3 Drawing Sheets

GAS LEAKAGE SENSING DEVICE

FIELD OF THE INVENTION

The present invention relates to a gas detection technology, and more particularly to a gas leakage sensing device.

DESCRIPTION OF RELATED ART

Generally, for example, there is a process gas in industrial equipment, such as heat exchange, boilers, heat treatment, natural gas, or exhaust gas treatment. The process gas mostly has a specific pressure, and is constructed using structural elements, such as pipes or cabins for diversion or storage.

Due to the existence of industrial equipment with process gas, after a period of use, the phenomenon of process gas leakage is often prone to affect the availability of such industrial equipment. If the leaking process gas is toxic, the damages to the environment, human health and even safety will pose a considerable threat. Therefore, once the process gas in such industrial equipment leaks, it must be immediately detected to protect the equipment's availability, environmental hygiene and public safety.

It is also known that today there are industrial equipment for process gas. Most of the time, gas measuring sensors, gas flow meters and other measuring elements are installed in gas diversion pipes or gas storage compartments to detect whether process gas leaks or to measure leaking flow, leaking volume, etc. However, since the volume of the gas is usually compressible, it is difficult to obtain the accuracy of the detection of the data, such as the flow rate and volume, when the small flow gas leaks in the prior art, and it is urgent to improve.

SUMMARY OF THE INVENTION

In view of this, the purpose of the present invention is to improve the problem that the accuracy of the existing industrial equipment in detecting leaking gas is still insufficient. In order to improve this problem, the present invention mainly introduces leaking gas into the liquid to generate bubbles, uses a bubble sensing component to observe the size of the bubbles and the frequency of floating in a unit time, and then accurately detects and measures the flow, volume and other data of the leaking gas.

To this end, the present invention provides a gas leakage sensing device in the embodiment, the structural means of which comprises a gas conduit, a liquid storage tank and a bubble sensing component with a relative arrangement feature between them. The gas leakage sensing device comprises a gas conduit for guiding the leaking gas of an industrial equipment, the gas conduit having an gas inlet end for receiving the leaking gas and an exhaust port for discharging the leakage gas; and a liquid storage tank filled with liquid, the liquid having a liquid surface, and the exhaust port being implanted in the liquid of the liquid storage tank so that the leaking gas being introduced into the liquid of the liquid storage tank to generate gas bubbles; wherein a monitoring part is formed on a tank wall of the liquid storage tank, and the monitoring part is provided with a bubble sensing component, and the height of the monitoring part from the liquid surface is smaller than the height of the exhaust port from the liquid surface. At the same time, the bubble sensing component is located between the liquid surface and the exhaust port. Furthermore, by sensing the size, amount of generated bubbles, and floating frequency of the bubbles generated in the liquid, the flow rate and volume of the leaking gas are obtained to improve the accuracy of sensing the leaking gas.

In another implementation of the present invention, a communicating hole below the liquid surface is further formed on the tank wall of the liquid storage tank, and the exhaust port is implanted in the liquid in a manner to connect the communicating hole.

In another implementation of the present invention, a manifold on the tank wall of the liquid storage tank is further formed for guiding the liquid and located lower than the liquid surface, and the tank wall of the manifold is formed with a communicating hole located lower than the liquid surface, the exhaust port is implanted in the liquid in a manner of connecting the communicating hole, and the monitoring part is located on a tube wall of the manifold bifurcated from the liquid storage tank.

According to the present invention, a liquid pumping motor is disposed in the liquid of the liquid storage tank, and the liquid pumping motor has a liquid drain which is connected to or adjacent to the corresponding communicating hole, and the liquid drain provides high-pressure liquid into the manifold.

In the above implementation of the present invention, the bubble sensing component is an ultrasonic sensor.

In the above implementation of the present invention, the bubble sensing component is a vision device equipped with a charge-coupled device, and the monitoring part is provided with the vision device to see through the liquid transparent characteristics of bubbles in the liquid.

According to the above structural configuration means of the present invention, the technical effect that by sensing the size, amount of generated bubbles, and floating frequency of the bubbles generated in the liquid, the flow rate and volume of the leaking gas are obtained to improve the accuracy of sensing the leaking gas.

In addition, related technical details on which the present invention can be implemented will be described in subsequent implementations and drawings.

DETAILED DESCRIPTION OF THE PREFERRED EMBODIMENT

Figure 1:
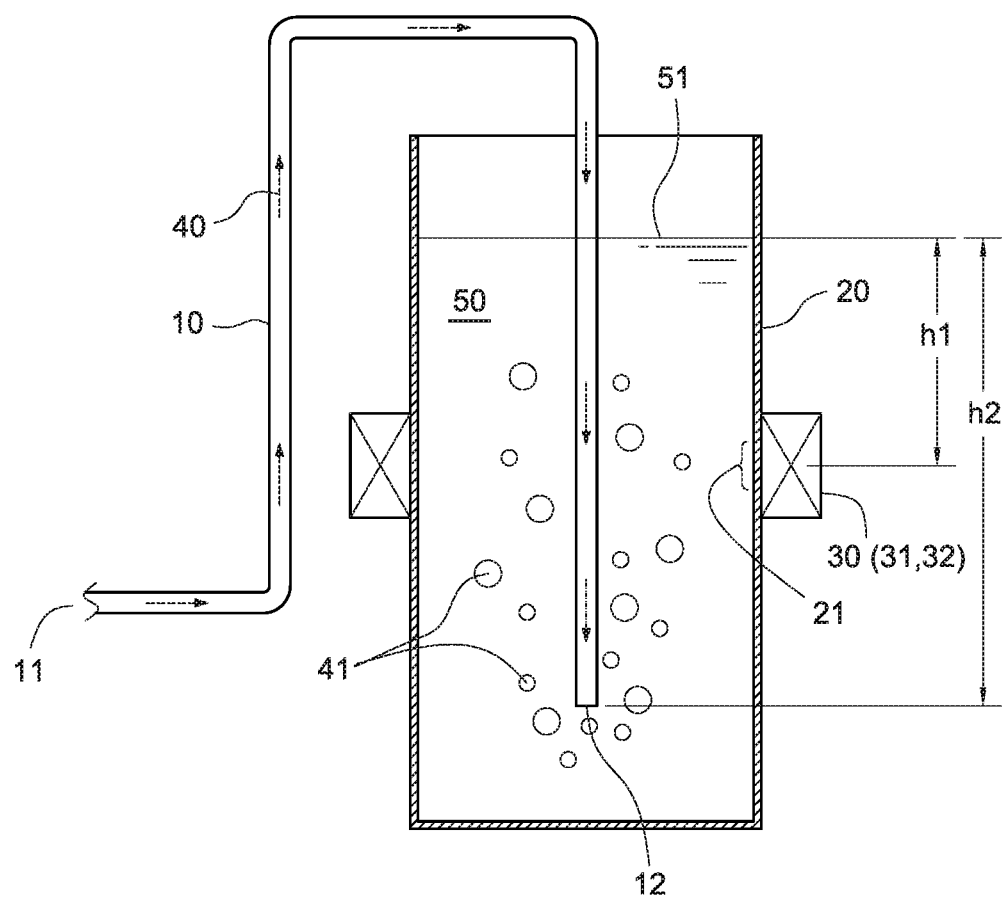
FIG. 1 is a cross-sectional view showing the configuration structure of a first embodiment of the present invention.

In order to fully explain the feasibility of the gas leakage sensing device provided by the present invention. First, referring to FIG. 1, the first embodiment of the present invention is disclosed to demonstrate that the provided gas leakage sensing device comprises at least one gas conduit 10, a liquid storage tank 20 and a bubble sensing component 30 in arrangement.

The role of the gas conduit 10 is to guide the leaking gas 40 of an industrial equipment, which may be a heat exchange equipment with a process gas, a boiler, a heat treatment equipment, a gas equipment or an exhaust gas treatment equipment. According to common knowledge, in order to prevent process gas leakage, such industrial equipment usually installs the gas conduit 10 for guiding leaking gas 40 at the locations where gas is easily leaked, such as a conduit connector, a cover connector, etc. of the diversion pipeline or the gas storage tank of the diversion process gas to prevent process gases from leaking into the atmosphere. Therefore, the gas conduit 10 has a gas inlet end 11 that receives the leaking gas 40 and an exhaust port 12 that discharges the leaking gas 40.

The liquid storage tank 20 may be surrounded by a transparent or opaque tank wall structure so that the liquid storage tank 20 communicates with the atmosphere and is filled with a liquid 50. The liquid surface 51 of the liquid 50 may be formed in the liquid storage tank 20. The liquid 50 may be water or other oil or solvent that does not affect the generation and floating of the gas bubbles 41. In different implementations of the embodiments, the liquid surface 51 of the liquid 50 may also be formed in other liquid tanks or diversion pipeline communicating with the liquid storage tank 20. The exhaust port 12 of the gas conduit 10 must be implanted in the liquid 50 of the liquid storage tank 20 in order to guide the leaking gas 40 to generate bubbles 41 in the liquid 50 of the liquid storage tank 20.

Furthermore, a monitoring part 21 is formed on the tank wall of the liquid storage tank 20. In essence, the monitoring part 21 is located at a place for assembling or disposing the bubble sensing component 30, and the monitoring part 21 is away from the liquid surface. The height h1 of monitoring part 21 from the liquid surface 51 must be smaller than the height h2 of the exhaust port 12 from the liquid surface 51 (that is, h1<h2). In other words, the monitoring part 21 is located at a relatively higher liquid surface from the lower exhaust port 12 so that the bubble sensing component 30 on the monitoring part 21 can conveniently continuously monitor whether bubbles 41 are generated in the liquid 50 and detect how much the size, amount and frequency of the bubbles generated.

In the implementation of the first embodiment shown in FIG. 1, the bubble sensing component 30 may be an ultrasonic sensor 31 or a vision device 32 equipped with a charge coupled device (CCD). These bubble sensing components 30 can be easily arranged on the monitoring part 21 of the tank wall of the liquid storage tank 20 by assembling means such as locking, sticking or buckling. When the bubble sensing component 30 is an ultrasonic sensor 31, the monitoring part 21 may be transparent or opaque. The ultrasonic sensor 31 generates the ultrasonic waves to penetrate the transparent or opaque monitoring part 21 (formed by the tank wall of the liquid storage tank 20) in order to sense the bubbles 41 in the liquid 50 of the liquid storage tank 20. In addition, when the bubble sensing component 30 is a vision device 32, the monitoring part 21 must be transparent so that the vision device 32 can see through the transparent monitoring part 21 (formed by the tank wall of the liquid storage tank 20) to see through the bubbles 41 in the liquid 50 of the liquid tank 20.

Figure 2:
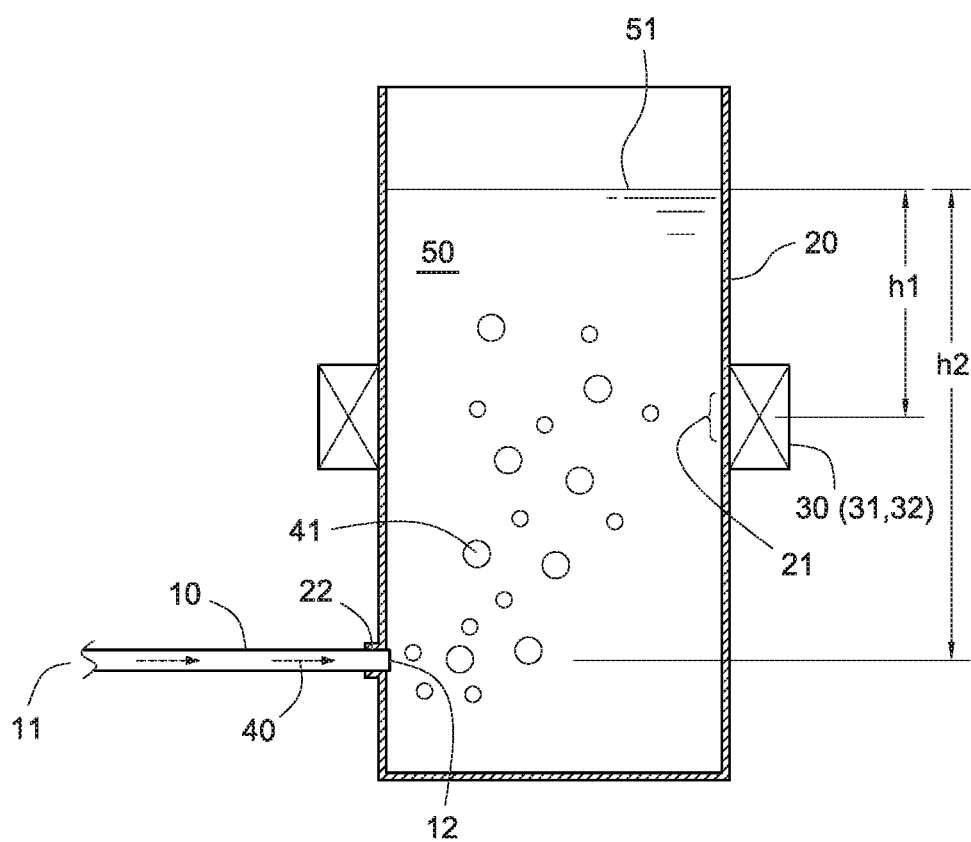
FIG. 2 is a cross-sectional view showing a configuration structure of a second embodiment of the present invention.

Please refer to refer to FIG. 2 to disclose a second embodiment of the present invention. It is demonstrated that a communicating hole 22 can be formed in the tank wall of the liquid storage tank 20, and the communicating hole 22 must be lower than the liquid surface 51 in order to facilitate that the exhaust port 12 provided with the gas conduit 10 can be connected to the communicating hole 22 and then implanted into the liquid 50, so that the gas conduit 10 can achieve the role of guiding the leaking gas 40 to generate the bubbles 41 in the liquid 50 of the liquid storage tank 20. Except for these, the remaining implementation details are the same as those of the above first embodiment.

Figure 3:
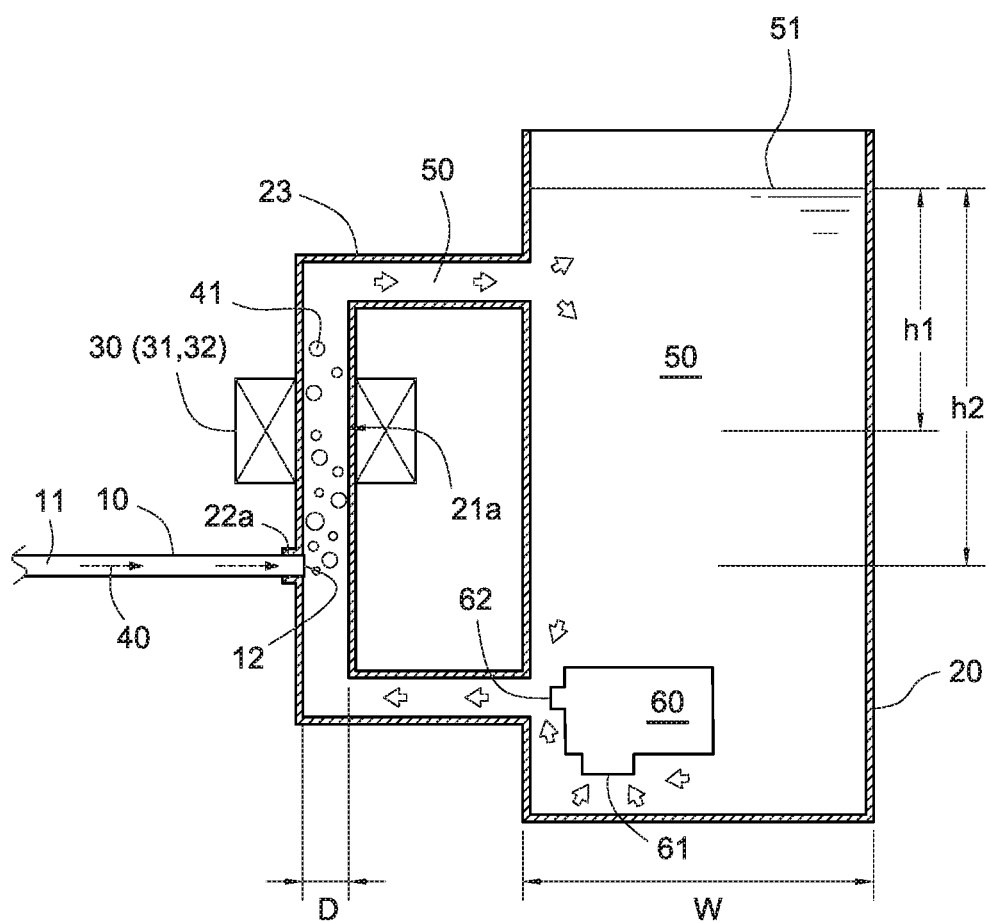
FIG. 3 is a cross-sectional view showing a configuration structure of a third embodiment of the present invention.

Please refer to FIG. 3 to disclose a third embodiment of the present invention. It is described that the tank wall of the liquid storage tank 20 is also forked or connected with a manifold 23, which is used for flow guidance. The liquid 50 in the liquid storage tank 20 enters so that the level of the manifold 23 can be lower than that of the liquid surface 51. In addition, the diameter D of the manifold 23 may be smaller than the width W of the liquid storage tank (that is, D<W), and both ends of the manifold 23 can be connected to the liquid storage tank 20 so that the liquid 50 can flow in the manifold 23. The communicating hole 22a in the second embodiment can be formed in this third embodiment. On the tank wall of the manifold 23, and the communicating hole 22a must also be located at a lower level than that the liquid surface 51, so that the exhaust port 12 of the gas conduit 10 is connected to the communicating hole 22a and then implanted in the liquid 50. The monitoring part 21a in the first and second embodiments described above is located on the pipe wall of the manifold 23 in this embodiment with the other remaining implementation details are the same as those in the above embodiment.

Referring to FIG. 3 again, in the third embodiment described above, a liquid pumping motor 60 is disposed in the liquid 50 of the liquid storage tank 20, and the liquid pumping motor 60 has a liquid intake 61 and a liquid drain 62. The liquid intake 61 captures liquid in the liquid 50, and is connected to or adjacent to the corresponding communicating hole 22 or 22a through the liquid drain 62 so as to drive the high-pressure liquid 50 into the manifold 23 to prevent the generation of insufficient vacuum or liquid volume in the liquid 50 in the manifold 23 to affect the generation of bubbles 41.

To sum up, the present invention relies on the ultrasonic penetrating sensing ability and charge-coupled device (CCD) recognition ability to detect the generation of bubbles 41 in the liquid 50, and the size of the bubbles 41. Both the quantity and the floating frequency can produce a sharp and accurate detection effect, and the above-mentioned bubble sensing component 30 is also convenient for transmitting the signal of the detected bubbles to the corresponding signal control unit, thereby accurately obtaining the flow rate of the leaking gas 40 and volume and other data. It can be seen that this invention is a fully implementable technology in the industry.

The above embodiments merely demonstrate the preferred embodiments of the present invention, but they cannot be understood as a limitation on the scope of the patents of the present invention. Therefore, the present invention shall be subject to the content of the claims defined in the scope of the patent application.

We claim:

1. A gas leakage sensing device comprising:
   a gas conduit for guiding leaking gas of an industrial equipment, the gas conduit having a gas inlet end for receiving the leaking gas and an exhaust port for discharging the leakage gas; and
   a liquid storage tank filled with liquid, the liquid having a liquid surface;
   wherein a monitoring part is formed on a tank wall of the liquid storage tank, and the monitoring part is provided with a bubble sensing component, and the height of the monitoring part from the liquid surface is smaller than the height of the exhaust port from the liquid surface,
   wherein the bubble sensing component is located between the liquid surface and the exhaust port;
   wherein a manifold on the tank wall of the liquid storage tank is further formed for guiding the liquid and located lower than the liquid surface, and a tube wall of the manifold is formed with a communicating hole located lower than the liquid surface, the exhaust port is connected to the communicating hole, and the monitoring part is located on the tube wall of the manifold bifurcated from the liquid storage tank;

wherein a liquid pumping motor is disposed in the liquid of the liquid storage tank, and the liquid pumping motor has a liquid drain which is connected to or adjacent to the communicating hole, and the liquid drain provides high-pressure liquid into the manifold.

2. The gas leakage sensing device as claimed in claim 1, wherein the bubble sensing component is an ultrasonic sensor.

3. The gas leakage sensing device as claimed in claim 1, wherein the bubble sensing component is a vision device equipped with a charge-coupled device, and the monitoring part is provided with the vision device to see through the liquid transparent characteristics of bubbles in the liquid.

* * * * *